(12) United States Patent
Kobayashi

(10) Patent No.: US 8,208,077 B2
(45) Date of Patent: Jun. 26, 2012

(54) TUNER UNIT APPARATUS

(75) Inventor: Takeshi Kobayashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 318 days.

(21) Appl. No.: 12/719,339

(22) Filed: Mar. 8, 2010

(65) Prior Publication Data
US 2010/0225829 A1    Sep. 9, 2010

(30) Foreign Application Priority Data
Mar. 6, 2009    (JP) .................... 2009-054049

(51) Int. Cl.
*H04N 5/50*    (2006.01)
(52) U.S. Cl. .............. 348/731; 348/554; 348/725
(58) Field of Classification Search .......... 348/731, 348/725–726, 553–555, 705–706; *H04N 5/50*
See application file for complete search history.

(56) References Cited

U.S. PATENT DOCUMENTS

| | | | |
|---|---|---|---|
| 5,646,699 A * | 7/1997 | Oh et al. ........................ | 348/553 |
| 7,730,507 B2 * | 6/2010 | Sakai et al. .................... | 725/14 |
| 2007/0109450 A1 * | 5/2007 | Lee ................................ | 348/730 |
| 2008/0074547 A1 * | 3/2008 | Ida ................................ | 348/554 |
| 2008/0098147 A1 | 4/2008 | Amano | |
| 2008/0123720 A1 | 5/2008 | Fujii | |

FOREIGN PATENT DOCUMENTS

| | | |
|---|---|---|
| EP | 1 679 888 A1 | 7/2006 |
| EP | 1 986 426 A2 | 10/2008 |
| JP | 7-49827 A | 2/1995 |
| JP | 11-220669 A | 8/1999 |
| JP | 2006-140846 A | 6/2006 |
| JP | 2008-271290 A | 11/2006 |
| JP | 2008-135973 A | 6/2008 |

OTHER PUBLICATIONS

Eiropean Search Report dated Sep. 8, 2010 (Seven (7) pages).

* cited by examiner

*Primary Examiner* — Trang U Tran
(74) *Attorney, Agent, or Firm* — Crowell & Moring LLP

(57) ABSTRACT

A tuner unit apparatus includes a main controller which controls receiving digital TV (television) signals, a sub controller which controls receiving analog TV signals, a demodulator which is located in a first communication line leading from the main controller to the tuner and switches modes of control signals transmitted from the main controller between a mode that the control signals are transmitted to the tuner via the first communication line and a mode that the control signals are not transmitted to the tuner, and a FET (field effect transistor) circuit which is located in a second communication line leading from the sub controller to the tuner and switches modes of control signals transmitted from the sub controller between a mode that the control signals are transmitted to the tuner via the second communication line and a mode that the control signals are not transmitted to the tuner.

3 Claims, 1 Drawing Sheet

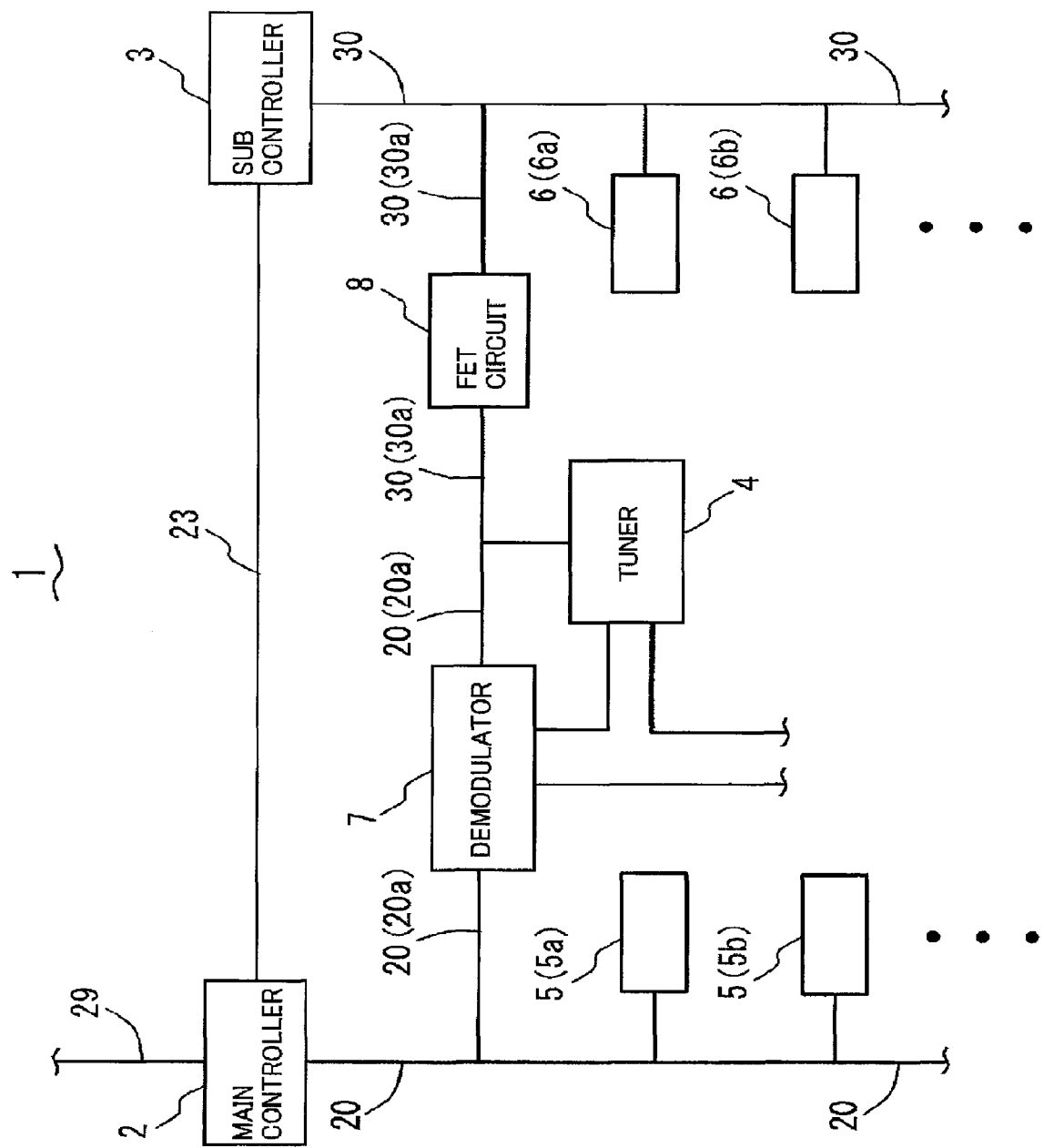

TUNER UNIT APPARATUS

BACKGROUND OF THE INVENTION

1. Field of the Invention

The present invention relates to a tuner unit apparatus which receives digital TV (television) signals and analog TV signals.

2. Description of the Related Art

Conventionally, there is a known tuner unit apparatus for receiving TV signals provided with a tuner which has a function to receive both digital TV signals and analog TV signals. There is also a known tuner unit apparatus which is further provided with a main controller and a sub controller so that the main controller and the sub controller control an operation of receiving TV signals in the tuner by I2C (inter-integrated circuit) communication.

In contrast, there is another known tuner unit apparatus provided with a tuner which has a function to receive both digital TV signals and analog TV signals. This tuner unit apparatus has a bus switch to switch between a digital reception control line and an analog reception control line, and the analog reception control line is connected to the bus switch via a MOSFET (metal-oxide semiconductor field-effect transistor) (refer to Japanese Laid-Open Patent Publication No. 2008-271290, for example). There is also a known tuner for satellite broadcasts which is provided with a first signal processing circuit for processing analog FM (frequency modulation) signals and a second signal processing circuit for processing digital QPSK (quadrature phase shift keying) signals. In this tuner, either the first signal processing circuit or the second signal processing circuit is switched ON, and other is switched OFF (refer to Japanese Patent Publication No. 3,504,847, for example). There is also a tuner unit apparatus which has a switching circuit which selectively switches between video signals and specific screen signals in a front end of a superposed circuit (refer to Japanese Utility Model Registration No. 3,052,682, for example). Moreover, there is a known tuner unit apparatus which receives TV signals of NTSC (National Television System Committee) system and TV signals of ATSC (Advanced Television System Committee) system. This tuner unit apparatus has plural switches for switching electrical power supplied to plural processing circuits ON and OFF separately and a switch for switching between destinations of received signals (refer to Japanese Laid-Open Patent Publication No. 2006-140846, for example). Moreover, there is also a known tuner unit apparatus which has a function to receive both digital TV signals and analog TV signals to stop forming an operation clock in a front end when receiving the analog TV signals so that the front end is switched to sleep mode (refer to Japanese Laid-Open Patent Publication No. 2008-135973, for example).

In the conventional tuner unit apparatus described above, when the sub controller controls an operation in a control object other than the tuner (a DAC (digital analog converter) which converts digital signals to analog signals, a scaler IC (integrated circuit) to convert resolution, an input-output selector for input-output selection of signals to an external equipment, a slicer IC to process EPG (electronic program guide) data, and a sound multiprocessing circuit to multiplex a sound, for example) while the main controller controls an operation of receiving the TV signals in the tuner, a communication by the main controller and a communication by the sub controller interfere with each other. As a result, the operating control of receiving the TV signals in the tuner by the main controller and the operating control in the control object other than the tuner by the sub controller cannot be simultaneously carried out.

Moreover, also when the main controller controls an operation in a control object other than the tuner while the sub controller controls an operation of receiving the TV signals in the tuner, a communication by the main controller and a communication by the sub controller interfere with each other. As a result, the operating control of receiving the TV signals in the tuner by the sub controller and the operating control in the control object other than the tuner by the main controller cannot be simultaneously carried out. Even when applying the matters disclosed in the above patent documents, the above problem cannot be solved.

SUMMARY OF THE INVENTION

The present invention is to solve the problem described above, and an object of the present invention is to provide a tuner unit apparatus in which a main controller and a sub controller control an operation of receiving TV signals in a tuner by I2C communication, and a communication by the main controller and a communication by the sub controller do not interfere with each other.

According to an aspect of the present invention, this object is achieved by a tuner unit apparatus comprising: a main controller which transmits control signals via a first communication line; a sub controller which transmits control signals via a second communication line; a common control object which is connected to both the first communication line and the second communication line and is controlled by the main controller and the sub controller; a main control object which is connected to the first communication line and is controlled by the main controller; and a sub control object which is connected to the second communication line and is controlled by the sub controller, wherein the common control object is a tuner which receives digital TV (television) signals and outputs the received digital TV signals, and also receives analog TV signals and outputs the received analog TV signals, the main controller controls an operation of receiving the digital TV signals in the tuner and an operation in the main control object by transmitting control signals by I2C (inter-integrated circuit) communication via the first communication line, and the sub controller controls an operation of receiving the analog TV signals in the tuner and an operation in the sub control object by transmitting control signals by I2C communication via the second communication line.

The tuner unit apparatus further comprises: a first switching circuit which is located in the first communication line leading from the main controller to the tuner and switches modes of the control signals which are transmitted from the main controller between a mode that the control signals are transmitted to the tuner via the first communication line and a mode that the control signals are not transmitted to the tuner; and a second switching circuit which is located in the second communication line leading from the sub controller to the tuner and switches modes of the control signals which are transmitted from the sub controller between a mode that the control signals are transmitted to the tuner via the second communication line and a mode that the control signals are not transmitted to the tuner.

The first switching circuit switches the mode so that the control signals transmitted from the main controller are not transmitted to the tuner via the first communication line when the sub controller controls the operation of receiving the analog TV signals in the tuner.

The second switching circuit switches the mode so that the control signals transmitted from the sub controller are not transmitted to the tuner via the second communication line when the main controller controls the operation of receiving the digital TV signals in the tuner.

In the above configuration, when the main controller controls the operation of receiving the digital TV signals in the tuner, the control signals transmitted from the sub controller are not transmitted to the tuner by the operation of the second switching circuit. Moreover, when the sub controller controls the operation of receiving the analog TV signals in the tuner, the control signals transmitted from the main controller are not transmitted to the tuner by the operation of the first switching circuit.

According to the above configuration, when the main controller controls the operation of receiving the digital TV signals in the tuner, the communication by the main controller and the communication by the sub controller do not interfere with each other, and when the sub controller controls the operation of receiving the analog TV signals in the tuner, the communication by the sub controller and the communication by the main controller do not interfere with each other. Accordingly, the operating control of receiving the digital TV signals in the tuner by the main controller and the operating control in the sub control object by the sub controller can be simultaneously carried out, and moreover, the operating control of receiving the analog TV signals in the tuner by the sub controller and the operating control in the main control object by the main controller can be simultaneously carried out.

It is preferable that the first switching circuit is a demodulator which processes the digital TV signals outputted from the tuner and has a repeater function to link and transmit the control signals which are transmitted from the main controller, therein when the repeater function is switched ON and OFF (active/inactive) by the control signals transmitted from the main controller, the demodulator switches the modes of the control signals which are transmitted from the main controller between the mode that the control signals are transmitted to the tuner via the first communication line and the mode that the control signals are not transmitted to the tuner.

It is more preferable that the second switching circuit is a FET (field effect transistor) circuit having a FET, therein when the FET is switched ON and OFF (conductive/nonconductive) by the control signals transmitted from the main controller through the demodulator, the FET circuit switches the modes of the control signals which are transmitted from the sub controller between the mode that the control signals are transmitted to the tuner via the second communication line and the mode that the control signals are not transmitted to the tuner.

According to the above configuration, it is possible that the communication by the main controller and the communication by the sub controller do not interfere with each other by the simple configuration.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein:

FIG. 1 is an electrical block configuration diagram showing a schematic configuration of a tuner unit apparatus according to a preferred embodiment of the present invention.

DESCRIPTION OF THE PREFERRED EMBODIMENTS

A tuner unit apparatus according to a preferred embodiment of the present invention is described with reference to FIG. 1. FIG. 1 shows a configuration of the tuner unit apparatus according to the present preferred embodiment. A tuner unit apparatus 1 receives digital TV signals and analog TV signals. The tuner unit apparatus 1 includes a main controller 2, a sub controller 3, a tuner 4 which is a common control object, a main control object 5 (5a, 5b, . . . ), a sub control object 6 (6a, 6b, . . . ), a demodulator 7, and a FET (field effect transistor) circuit 8.

The main controller 2 and the sub controller 3 control the tuner unit apparatus 1. The main controller 2 receives operation signals (signals which indicate contents of operations of a user) inputted from an operation signal input line 29 and controls the tuner unit apparatus 1. The main controller 2 and the sub controller 3 communicate with each other via an inter-controller communication line 23, and the sub controller 3 receives an instruction from the main controller 2 and controls the tuner unit apparatus 1. The main controller 2 transmits various control signals to control the tuner unit apparatus 1 by I2C communication via a first communication line 20. The sub controller 3 transmits various control signals to control the tuner unit apparatus 1 by the I2C communication via a second communication line 30.

Upon receiving digital TV signals, the tuner 4 outputs the received digital TV signals, and upon receiving analog TV signals, the tuner 4 outputs the received analog TV signals. The tuner 4 is controlled by the main controller 2 and the sub controller 3 and is connected to both the first communication line 20 and the second communication line 30.

The main control object 5 (5a, 5b, . . . ) is controlled by the main controller 2 and is connected to the first communication line 20. The sub control object 6 (6a, 6b, . . . ) is controlled by the sub controller 3 and is connected to the second communication line 30. The main control object 5 (5a, 5b, . . . ) and the sub control object 6 (6a, 6b, . . . ) are a DAC (digital analog converter) which converts digital signals to analog signals, a scaler IC to convert resolution, an input-output selector for input-output selection of signals to an external equipment, a slicer IC to process EPG data, and a sound multiprocessing circuit to multiplex a sound, for example.

The demodulator 7 processes the digital TV signals which are outputted from the tuner 4. The demodulator 7, which is located in the first communication line 20 (20a) leading from the main controller 2 to the tuner 4, switches modes of the control signals which are transmitted from the main controller 2 between the mode that the control signals are transmitted to the tuner 4 via the first communication line 20 and the mode that the control signals are not transmitted to the tuner 4. The demodulator 7 makes up a first switching means.

The FET circuit 8, which is located in the second communication line 30 (30a) leading from the sub controller 3 to the tuner 4, switches modes of the control signals which are transmitted from the sub controller 3 between the mode that the control signals are transmitted to the tuner 4 via the second communication line 30 and the mode that the control signals are not transmitted to the tuner 4. The FET circuit 8 makes up a second switching means.

The main controller 2 transmits the control signals by the I2C communication via the first communication line 20 to control the operation of receiving the digital TV signals in the tuner 4, the operation in the main control object 5 (5a, 5b, . . . ), the operation in the demodulator 7, and the operation in the FET circuit 8. The sub controller 3 transmits the control signals by the I2C communication via the second communication line 30 to control the operation of receiving the analog TV signals in the tuner 4 and the operation in the sub control object 6 (6a, 6b, . . . ).

When the main controller 2 and the sub controller 3 control the tuner 4 by the I2C communication, the tuner unit apparatus 1 receives the digital TV signals and the analog TV signals. The digital TV signals outputted from the tuner 4 are signals which relate to images and audio and TS (Transport Stream) signals in which EPG data or the like are digitally compressed, decoded and multiplexed, for example. The digital TV signals outputted from the tuner 4 are expanded and demodulated in the demodulator 7 and subsequently outputted from the demodulator 7. Signal processing are performed on the digital TV signals which are outputted from the demodulator 7 (after being expanded and demodulated) and the analog TV signals which are outputted from the tuner 4 in various signal processor in the main control object 5 (5a, 5b, . . . ) and the sub control object 6 (6a, 6b, . . . ), and subsequently, the processed received signals are provided to a display and a speaker of an external equipment.

The demodulator 7 has a repeater function to link and transmit the control signals which are transmitted from the main controller 2, so that when the repeater function is ON (the repeater function is active), the demodulator 7 links and transmits the control signals transmitted from the main controller 2, and when the repeater function is OFF (the repeater function is not active), the demodulator 7 does not link and transmit the control signals transmitted from the main controller 2. In other words, when the repeater function is ON, the demodulator 7 switches the mode so that the control signals transmitted from the main controller 2 are transmitted to the tuner 4 via the first communication line 20 and when the repeater function is OFF, the demodulator 7 switches the mode so that the control signals transmitted from the main controller 2 are not transmitted to the tuner 4 via the first communication line 20. When the sub controller 3 controls the operation of receiving the analog TV signals in the tuner 4, the demodulator 7 switches the repeater function OFF, so that the control signals transmitted from the main controller 2 are not transmitted to the tuner 4 via the first communication line 20.

Upon receiving the control signals transmitted from the main controller 2 by the I2C communication via the first communication line 20, the demodulator 7 switches the repeater function ON and OFF. In other words, when the repeater function is switched ON and OFF by the control signals transmitted from the main controller 2, the demodulator 7 switches the modes of the control signals, which are transmitted from the main controller 2 afterward, between the mode that the control signals are transmitted to the tuner 4 via the first communication line 20 and the mode that the control signals are not transmitted to the tuner 4.

The FET circuit 8 has a FET, so that when the FET is ON (the FET is conductive), the FET circuit 8 switches the mode so that the control signals transmitted from the sub controller 3 are transmitted to the tuner 4, and when the FET is OFF (the FET is not conductive), the FET circuit 8 switches the mode so that control signals transmitted from the sub controller 3 are not transmitted to the tuner 4. When the main controller 2 controls the operation of receiving the digital TV signals in the tuner 4, the FET circuit 8 switches the FET OFF, so that the control signals transmitted from the sub controller 3 are not transmitted to the tuner 4 via the second communication line 30.

Upon receiving the control signals which are transmitted from the main controller 2 and linked and transmitted from the demodulator 7, the FET circuit 8 switches the FET ON and OFF. In other words, when the FET is switched between ON and OFF by the control signals transmitted from the main controller 2 and linked and transmitted from the demodulator 7, the FET circuit 8 switches the modes of the control signals, which are transmitted from the sub controller 3 afterward, between the mode that the control signals are transmitted to the tuner 4 via the second communication line 30 and the mode that the control signals are not transmitted to the tuner 4.

Subsequently, the operation of the tuner unit apparatus 1 is described hereinafter. The tuner unit apparatus 1 operates under the control of the main controller 2 and the sub controller 3 in the manner described below in cases that (1) the operation signals which indicate that the digital TV signals are received are inputted from the operation signal input line 29 to the main controller 2 when the analog TV signals are not received, (2) the operation signals which indicate that the analog TV signals are received are inputted from the operation signal input line 29 to the main controller 2 when the digital TV signals are not received, (3) the operation signals which indicate that the digital TV signals are received are inputted from the operation signal input line 29 to the main controller 2 when the analog TV signals are received, and (4) the operation signals which indicate that the analog TV signals are received are inputted from the operation signal input line 29 to the main controller 2 when the digital TV signals are received.

(1) In case that the operation signals which indicate that the digital TV signals are received are inputted from the operation signal input line 29 to the main controller 2 when the analog TV signals are not received:

In the case of (1), the main controller 2 firstly transmits the control signals to instruct the demodulator 7 to switch the repeater function ON via the first communication line 20. Upon receiving the control signals, the demodulator 7 switches the repeater function ON.

Subsequently, the main controller 2 transmits the control signals to instruct the FET circuit 8 to switch the FET OFF via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the FET circuit 8 to switch the FET OFF), the FET circuit 8 switches the FET OFF.

Subsequently, the main controller 2 transmits the control signals to instruct the tuner 4 to receive the digital TV signals via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the tuner 4 to receive the digital TV signals), the tuner 4 receives the digital TV signals. At this time, the FET circuit 8, whose FET is OFF, does not transmit the control signals transmitted from the sub controller 3. In other words, once the main controller 2 transmits the control signals to instruct the tuner 4 to receive the digital TV signals via the first communication line 20 (that is to say, when the main controller 2 controls the operation of receiving the digital TV signals in the tuner 4), the control signals transmitted from the sub controller 3 are not transmitted to the tuner 4 even when the sub controller 3 transmits the control signals to instruct the operation in the sub control object 6 (6a, 6b, . . . ) via the second communication line 30.

(2) In case that the operation signals which indicate that the analog TV signals are received are inputted from the operation signal input line 29 to the main controller 2 when the digital TV signals are not received:

In the case of (2), the main controller 2 firstly transmits the control signals to instruct the demodulator 7 to switch the repeater function ON via the first communication line 20. Upon receiving the control signals, the demodulator 7 switches the repeater function ON.

Subsequently, the main controller 2 transmits the control signals to instruct the FET circuit 8 to switch the FET ON via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the FET circuit 8 to switch the FET ON), the FET circuit 8 switches the FET ON. Then, the main controller 2 transmits the control signals to instruct the demodulator 7 to switch the repeater function OFF via the first communication line 20. Upon receiving the control signals, the demodulator 7 switches the repeater function OFF.

Subsequently, the main controller 2 instructs the sub controller 3 to receive the analog TV signals via the inter-controller communication line 23. Upon receiving the instruction, the sub controller 3 transmits the control signals to instruct the tuner 4 to receive the analog TV signals via the second communication line 30. At this time, the FET circuit 8, whose FET is ON, transmits to the tuner 4 the control signals transmitted from the sub controller 3. Upon receiving the control signals transmitted from the sub controller 3 (the control signals to instruct the tuner 4 to receive the analog TV signals), the tuner 4 receives the analog TV signals. At this time, the demodulator 7, whose repeater function is OFF, does not link and transmit the control signals transmitted from the main controller 2. In other words, once the sub controller 3 transmits the control signals to instruct the tuner 4 to receive the analog TV signals via the second communication line 30 (that is to say, when the sub controller 3 controls the operation of receiving the analog TV signals in the tuner 4), the control signals transmitted from the main controller 2 are not transmitted to the tuner 4 even when the main controller 2 transmits the control signals to instruct the operation in the main control object 5 (5a, 5b, . . . ) via the first communication line 20.

(3) In case that the operation signals which indicate that the digital TV signals are received are inputted from the operation signal input line 29 to the main controller 2 when the analog TV signals are received:

In the case of (3), the main controller 2 firstly instructs the sub controller 3 to finish receiving the analog TV signals via the inter-controller communication line 23. Upon receiving the instruction, the sub controller 3 transmits the control signals to instruct the tuner 4 to finish receiving the analog TV signals via the second communication line 30. At this time, the FET circuit 8, whose FET is ON, transmits to the tuner 4 the control signals transmitted from the sub controller 3. Upon receiving the control signals transmitted from the sub controller 3 (the control signals to instruct the tuner 4 to finish receiving the analog TV signals), the tuner 4 finishes receiving the analog TV signals.

Subsequently, the main controller 2 transmits the control signals to instruct the demodulator 7 to switch the repeater function ON via the first communication line 20. Upon receiving the control signals, the demodulator 7 switches the repeater function ON. Then, the main controller 2 transmits the control signals to instruct the FET circuit 8 to switch the FET OFF via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the FET circuit 8 to switch the FET OFF), the FET circuit 8 switches the FET OFF.

Subsequently, the main controller 2 transmits the control signals to instruct the tuner 4 to receive the digital TV signals via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the tuner 4 to receive the digital TV signals), the tuner 4 receives the digital TV signals. At this time, the FET circuit 8, whose FET is OFF, does not transmit the control signals transmitted from the sub controller 3. In other words, once the main controller 2 transmits the control signals to instruct the tuner 4 to receive the digital TV signals via the first communication line 20 (that is to say, when the main controller 2 controls the operation of receiving the digital TV signals in the tuner 4), the control signals transmitted from the sub controller 3 are not transmitted to the tuner 4 even when the sub controller 3 transmits the control signals to instruct the operation in the sub control object 6 (6a, 6b, . . . ) via the second communication line 30.

(4) In case that the operation signals which indicate that the analog TV signals are received are inputted from the operation signal input line 29 to the main controller 2 when the digital TV signals are received:

In the case of (4), the main controller 2 firstly transmits the control signals to instruct the tuner 4 to finish receiving the digital TV signals via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the tuner 4 to finish receiving the digital TV signals), the tuner 4 finishes receiving the digital TV signals.

Subsequently, the main controller 2 transmits the control signals to instruct the FET circuit 8 to switch the FET ON via the first communication line 20. At this time, the demodulator 7, whose repeater function is ON, links and transmits the control signals transmitted from the main controller 2 by the repeater function. Upon receiving the control signals transmitted from the main controller 2 (the control signals to instruct the FET circuit 8 to switch the FET ON), the FET circuit 8 switches the FET ON. Then, the main controller 2 transmits the control signals to instruct the demodulator 7 to switch the repeater function OFF via the first communication line 20. Upon receiving the control signals, the demodulator 7 switches the repeater function OFF.

Subsequently, the main controller 2 instructs the sub controller 3 to receive the analog TV signals via the inter-controller communication line 23. Upon receiving the instruction, the sub controller 3 transmits the control signals to instruct the tuner 4 to receive the analog TV signals via the second communication line 30. At this time, the FET circuit 8, whose FET is ON, transmits the control signals transmitted from the sub controller 3. Upon receiving the control signals transmitted from the sub controller 3 (the control signals to instruct the tuner 4 to receive the analog TV signals), the tuner 4 receives the analog TV signals. At this time, the demodulator 7, whose repeater function is OFF, does not link and transmit the control signals transmitted from the main controller 2. In other words, once the sub controller 3 transmits the control signals to instruct the tuner 4 to receive the analog TV signals via the second communication line 30 (that is to say, when the sub controller 3 controls the operation of receiving the analog TV signals in the tuner 4), the control signals transmitted from the main controller 2 are not transmitted to the tuner 4 even when the main controller 2 transmits the control signals to instruct the operation in the main control object 5 (5a, 5b, . . . ) via the first communication line 20.

According to the tuner unit apparatus 1 having the above configuration, when the main controller 2 controls the operation of receiving the digital TV signals in the tuner 4, the control signals transmitted from the sub controller 3 are not transmitted to the tuner 4 by the operation of the FET circuit 8. Moreover, when the sub controller 3 controls the operation of receiving the analog TV signals in the tuner 4, the control signals transmitted from the main controller 2 are not transmitted to the tuner 4 by the operation of the demodulator 7.

Consequently, when the main controller 2 controls the operation of receiving the digital TV signals in the tuner 4, the communication by the main controller 2 and the communication by the sub controller 3 do not interfere with each other, and when the sub controller 3 controls the operation of receiving the analog TV signals in the tuner 4, the communication by the sub controller 3 and the communication by the main controller 2 do not interfere with each other.

Accordingly, the operating control of receiving the digital TV signals in the tuner 4 by the main controller 2 and the operating control in the sub control object 6 (6a, 6b, . . . ) by the sub controller 3 can be simultaneously carried out, and moreover, the operating control of receiving the analog TV signals in the tuner 4 by the sub controller 3 and the operating control in the main control object 5 (5a, 5b, . . . ) by the main controller 2 can be simultaneously carried out.

In addition, the demodulator 7 which processes the digital TV signals outputted from the tuner 4 is used to prevent the transmittance of the control signals which are transmitted from the main controller 2 to the tuner 4 when the sub controller 3 controls the operation of receiving the analog TV signals in the tuner 4, so that it is possible that the communication by the main controller 2 and the communication by the sub controller 3 do not interfere with each other by the simple configuration.

Moreover, the FET circuit 8 is used to prevent the transmittance of the control signals which are transmitted from the sub controller 3 to the tuner 4 when the main controller 2 controls the operation of receiving the digital TV signals in the tuner 4, so that it is possible that the communication by the main controller 2 and the communication by the sub controller 3 do not interfere with each other by the simple configuration.

The present invention is not limited to the configuration of the above preferred embodiment, however, various modification are applicable within the scope of the invention. For example, it is also applicable that the control signals transmitted from the main controller are not transmitted to the tuner when the sub controller controls the operation of receiving the analog TV signals in the tuner by using other means instead of the demodulator. Moreover, it is also applicable that the control signals transmitted from the sub controller are not transmitted to the tuner when the main controller controls the operation of receiving the digital TV signals in the tuner by using other means instead of the FET circuit.

What is claimed is:

1. A tuner unit apparatus, comprising:
a main controller which transmits control signals via a first communication line;
a sub controller which transmits control signals via a second communication line;
a common control object which is connected to both the first communication line and the second communication line and is controlled by the main controller and the sub controller;
a main control object which is connected to the first communication line and is controlled by the main controller; and
a sub control object which is connected to the second communication line and is controlled by the sub controller, wherein
the common control object is a tuner which receives digital TV (television) signals and outputs the received digital TV signals, and also receives analog TV signals and outputs the received analog TV signals,
the main controller controls an operation of receiving the digital TV signals in the tuner and an operation in the main control object by transmitting control signals by I2C (inter-integrated circuit) communication via the first communication line, and
the sub controller controls an operation of receiving the analog TV signals in the tuner and an operation in the sub control object by transmitting control signals by I2C communication via the second communication line, the tuner unit apparatus further comprises:
a first switching circuit which is located in the first communication line leading from the main controller to the tuner and switches modes of the control signals which are transmitted from the main controller between a mode that the control signals are transmitted to the tuner via the first communication line and a mode that the control signals are not transmitted to the tuner; and
a second switching circuit which is located in the second communication line leading from the sub controller to the tuner and switches modes of the control signals which are transmitted from the sub controller between a mode that the control signals are transmitted to the tuner via the second communication line and a mode that the control signals are not transmitted to the tuner, wherein
the first switching circuit switches the mode so that the control signals transmitted from the main controller are not transmitted to the tuner via the first communication line when the sub controller controls the operation of receiving the analog TV signals in the tuner, and
the second switching circuit switches the mode so that the control signals transmitted from the sub controller are not transmitted to the tuner via the second communication line when the main controller controls the operation of receiving the digital TV signals in the tuner.

2. The tuner unit apparatus according to claim 1, wherein the first switching circuit is a demodulator which processes the digital TV signals outputted from the tuner and has a repeater function to link and transmit the control signals which are transmitted from the main controller, and wherein
when the repeater function is switched ON and OFF (active/inactive) by the control signals transmitted from the main controller, the demodulator switches the modes of the control signals which are transmitted from the main controller between the mode that the control signals are transmitted to the tuner via the first communication line and the mode that the control signals are not transmitted to the tuner.

3. The tuner unit apparatus according to claim 2, wherein the second switching circuit is a FET (field effect transistor) circuit having a FET, and wherein when the FET is switched ON and OFF (conductive/nonconductive) by the control signals transmitted from the main controller through the demodulator, the FET circuit switches the modes of the control signals which are transmitted from the sub controller between the mode that the control signals are transmitted to the tuner via the second communication line and the mode that the control signals are not transmitted to the tuner.

* * * * *